United States Patent
Higuchi et al.

(10) Patent No.: US 10,898,980 B2
(45) Date of Patent: Jan. 26, 2021

(54) TURNTABLE

(71) Applicant: HIRATA CORPORATION, Kumamoto (JP)

(72) Inventors: Takeru Higuchi, Kumamoto (JP); Yuichi Iwata, Kumamoto (JP); Bungo Matsumoto, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 501 days.

(21) Appl. No.: 15/902,558

(22) Filed: Feb. 22, 2018

(65) Prior Publication Data

US 2018/0178335 A1    Jun. 28, 2018

Related U.S. Application Data

(63) Continuation of application No. PCT/JP2016/087081, filed on Dec. 13, 2016.

(51) Int. Cl.
| | |
|---|---|
| *A47B 11/00* | (2006.01) |
| *B23Q 1/52* | (2006.01) |
| *A47B 13/08* | (2006.01) |
| *B25H 1/14* | (2006.01) |

(52) U.S. Cl.
CPC .............. *B23Q 1/522* (2013.01); *A47B 11/00* (2013.01); *A47B 13/081* (2013.01); *B25H 1/14* (2013.01)

(58) Field of Classification Search
CPC ....... B23Q 1/522; A47B 11/00; A47B 13/081; B25H 1/14
See application file for complete search history.

(56) References Cited

U.S. PATENT DOCUMENTS

| | | | | |
|---|---|---|---|---|
| 3,850,051 | A | * 11/1974 | Woltjen | B23Q 1/287 74/821 |
| 3,977,263 | A | 8/1976 | Nara | |
| 4,512,214 | A | * 4/1985 | Surman | B23Q 16/065 74/436 |
| 4,606,244 | A | * 8/1986 | Schneemann | B23Q 16/06 74/816 |

(Continued)

FOREIGN PATENT DOCUMENTS

| | | |
|---|---|---|
| CN | 202657675 U | 1/2013 |
| JP | H-2-43822 | 3/1990 |

(Continued)

OTHER PUBLICATIONS

Office Action dated Jul. 1, 2019, by the Chinese Patent Office in corresponding Chinese Patent Application No. 201680051451.5. (5 pages).

(Continued)

*Primary Examiner* — David M Fenstermacher
(74) *Attorney, Agent, or Firm* — Buchanan Ingersoll & Rooney PC

(57) ABSTRACT

A turntable includes a rotatably supported table, an electric cylinder, and a cam mechanism configured to convert the linear motion of the electric cylinder into the rotary motion of the table. The cam mechanism includes at least one cam groove provided on the table side, and at least one cam follower moved in parallel to the linear motion direction of the electric cylinder and configured to engage with the at least one cam groove.

15 Claims, 13 Drawing Sheets

(56) References Cited

U.S. PATENT DOCUMENTS

| | | | | |
|---|---|---|---|---|
| 4,724,760 A | * | 2/1988 | Bubley | B41F 15/0863 |
| | | | | 101/115 |
| 5,087,317 A | * | 2/1992 | Rogall | B65C 9/04 |
| | | | | 156/446 |
| 5,609,061 A | * | 3/1997 | Moller | B23Q 1/522 |
| | | | | 384/502 |
| 5,819,586 A | * | 10/1998 | Butcher | F16H 27/02 |
| | | | | 74/129 |

FOREIGN PATENT DOCUMENTS

| | | |
|---|---|---|
| JP | 03-115016 A | 5/1991 |
| JP | H05-039040 A | 2/1993 |
| JP | 2005-095692 A | 4/2005 |
| JP | 4478345 B2 | 6/2010 |
| JP | 5424124 B2 | 2/2014 |
| WO | WO 2014/196094 A1 | 12/2014 |

OTHER PUBLICATIONS

Office Action dated Mar. 18, 2019, by the Korean Patent Office in corresponding Korean Patent Application No. 10-2018-7005656. (3 pages).

International Search Report (PCT/ISA/210) dated Mar. 21, 2017, by the Japanese Patent Office as the International Searching Authority for International Application No. PCT/JP2016/087081.

Written Opinion (PCT/ISA/237) dated Mar. 21, 2017, by the Japanese Patent Office as the International Searching Authority for International Application No. PCT/JP2016/087081.

\* cited by examiner

ST1

ST2

ST3

ST4

ST5

ST6

TURNTABLE

This application is a continuation of International Patent Application No. PCT/JP2016/087081 filed on Dec. 13, 2016, the entire content of which is incorporated herein by reference.

TECHNICAL FIELD

The present invention relates to a turntable.

BACKGROUND ART

As a device for changing the orientation of an article, a turntable is known (for example, Japanese Patent Laid-Open No. 2005-95692, Japanese Patent No. 5424124 or Japanese Patent No. 4478345). The turntable is used to change the orientation of a work in the conveyance path of the work at, for example, a production facility. As a driving mechanism for the turntable, a mechanism configured to convert the linear motion of a cylinder into the rotary motion of a table has been proposed (for example, Japanese Patent No. 5424124 or Japanese Patent No. 4478345).

To smoothly and safely change the orientation of the work on the table, the turntable needs smoothness of the rotation operation of the table. In addition, responsiveness of the rotation operation of the table is also needed from the viewpoint of work conveyance efficiency.

SUMMARY OF INVENTION

It is an object of the present invention to provide a turntable capable of smoothly rotating a table at high responsiveness.

According to an aspect of the present invention, there is provided a turntable comprising: a table rotatably supported; an electric cylinder; and a cam mechanism configured to convert a linear motion of the electric cylinder into a rotary motion of the table, wherein the cam mechanism comprises: at least one cam groove provided on a side of the table; and at least one cam follower moved in parallel to a linear motion direction of the electric cylinder and configured to engage with the at least one cam groove.

Further features of the present invention will become apparent from the following description of exemplary embodiments (with reference to the attached drawings).

DESCRIPTION OF EMBODIMENTS

Figure 1:
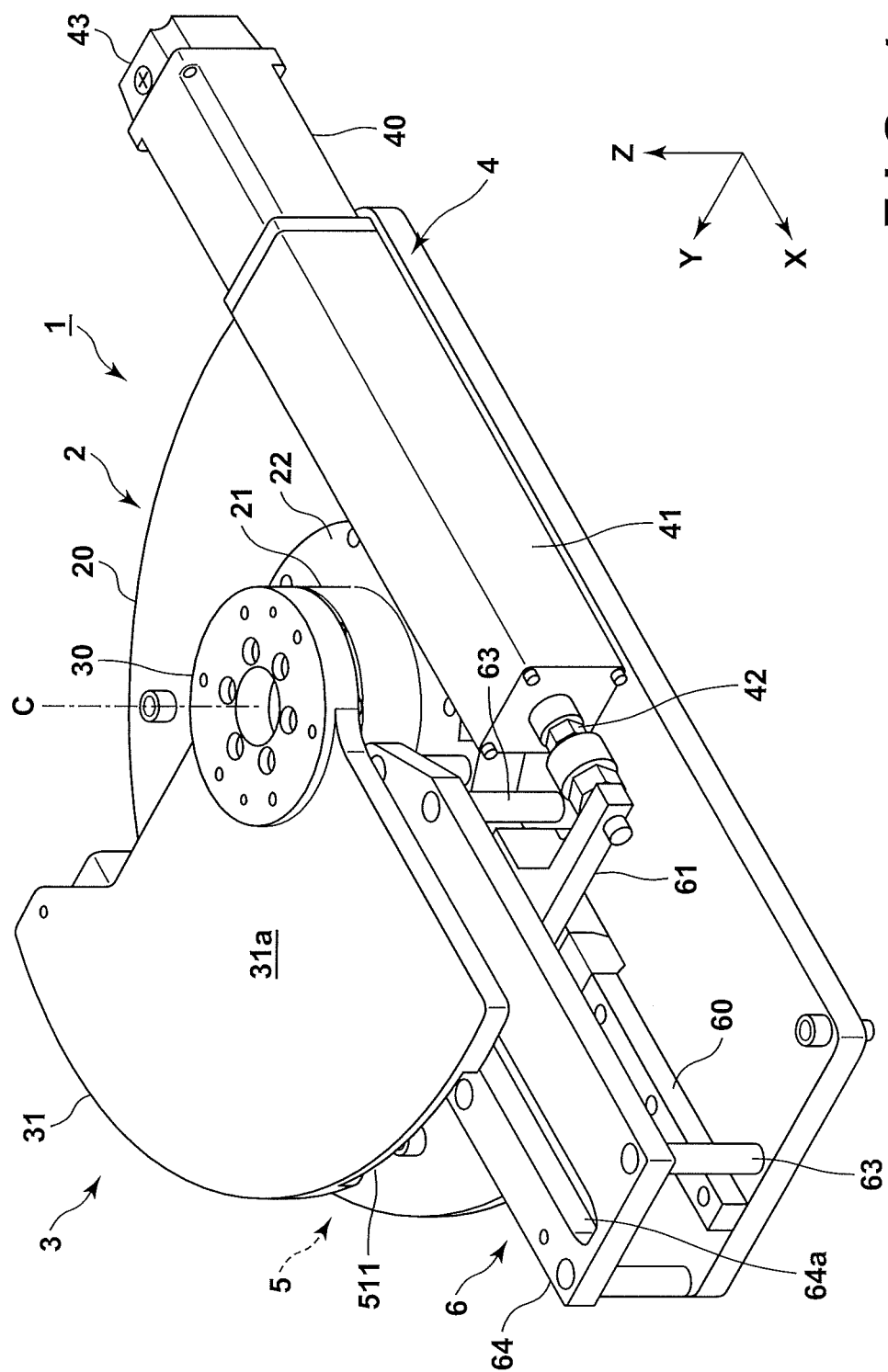
FIG. 1 is a perspective view of a turntable according to an embodiment.

Embodiments of the present invention will be described with reference to the accompanying drawings. Note that in the drawings, X and Y represent horizontal directions orthogonal to each other, and Z represents a vertical direction.

First Embodiment

FIG. 1 is a perspective view of a turntable 1 according to an embodiment of the present invention. The turntable 1 includes a base 2, a table 3, an electric cylinder 4, a cam mechanism 5 (most part is invisible in FIG. 1), and a guide mechanism 6.

The base 2 rotatably supports the table 3. The base 2 includes a plate-shaped main body 20, a pivotal support portion 22 provided on the main body 20, and a rotating shaft 21 rotatably supported by the pivotal support portion 22. The axial direction of the rotating shaft 21 is the Z direction.

A work is placed on the table 3. The table 3 is rotatably supported by the base 2. In this embodiment, the table 3 repetitively pivots within the range of about 90°. That is, the orientation of the placed work can be changed by 90°. The table 3 is a plate-shaped member as a whole. In this embodiment, the table 3 integrally includes a circular central portion 30 fixed to the rotating shaft 21 and a sector mount portion 31. An alternate long and short dashed line C indicates the rotation center line of the table 3, that is, the rotation center line of the rotating shaft 21. The mount portion 31 includes an upper surface 31a that forms a work placement surface, and a lower surface 31b (see FIG. 3) on the opposite side of the upper surface 31a. The upper surface 31a and the lower surface 31b are horizontal surfaces.

The electric cylinder 4 is a driving source configured to generate a turning force for the table 3. Using the electric cylinder 4 as the driving source makes it possible to cope with formation of an electric (airless) production facility. The electric cylinder 4 includes a motor 40, a conversion unit 41, a rod 42, and a circuit unit 43. The motor 40 is, for example, a DC motor, and its rotating shaft direction is set to the X direction.

The conversion unit 41 includes a conversion mechanism configured to convert the rotation of the motor 40 into the linear motion of the rod 42. In this embodiment, the conversion mechanism is a ball screw mechanism. The ball screw of the ball screw mechanism is attached to the rotating shaft of the motor 40, and the ball nut is attached to the rod 42. The conversion unit 41 may include an electromagnetic brake that is provided between the motor 40 and the conversion mechanism to brake the rotating shaft of the motor 40. By the operation of the electromagnetic brake, the movement of the rod 42 can be stopped more reliably.

The circuit unit 43 includes the driving circuit of the motor 40 and sensors such as a rotary encoder that detects the rotation amount of the motor 40. The circuit unit 43 drives the motor 40 in response to input of a control signal from the outside. The control signal from the outside is output from, for example, a control computer or an operation unit that accepts an instruction input from an operator.

Figure 2:
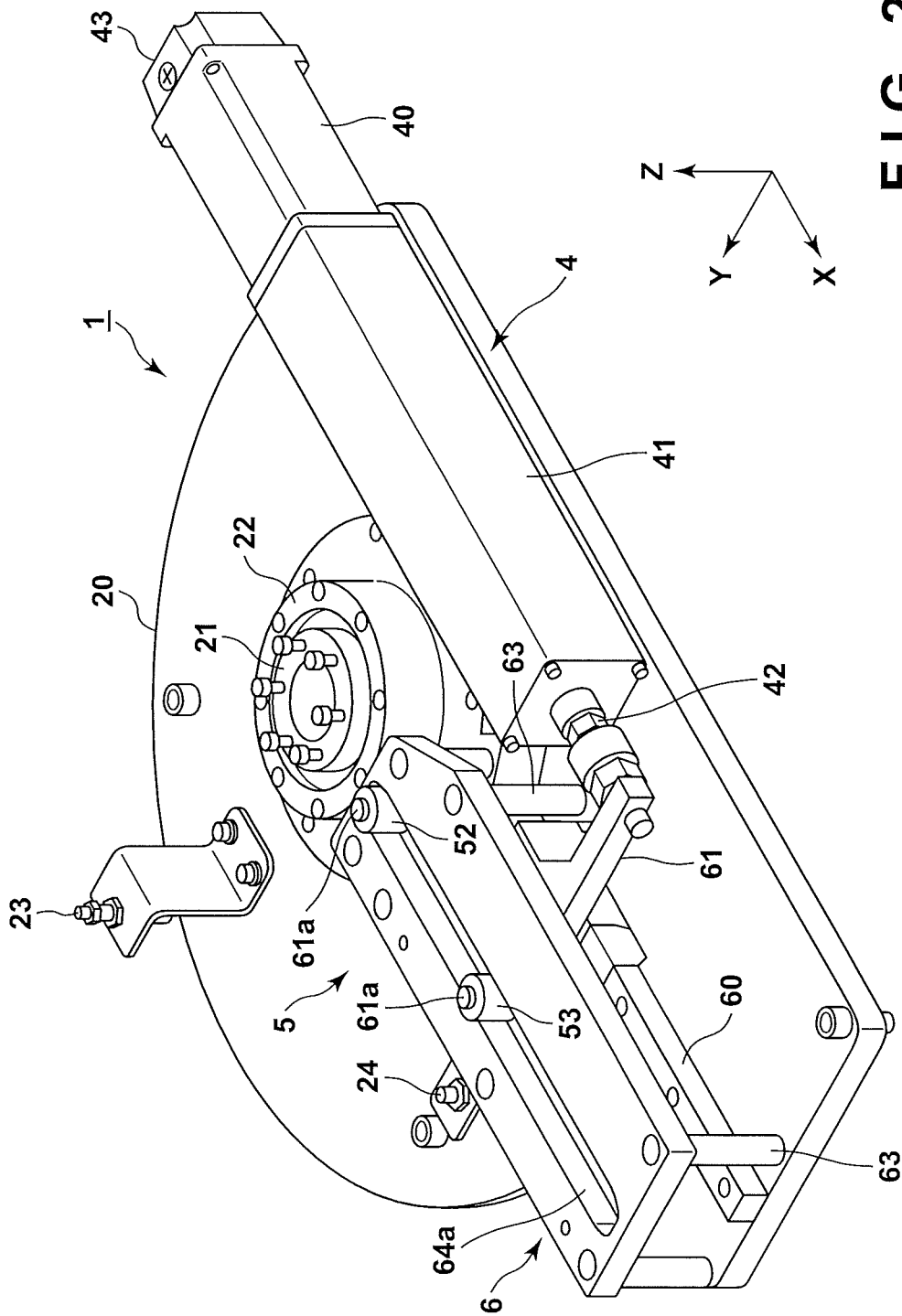
FIG. 2 is a perspective view of the turntable without a table.
Figure 3:
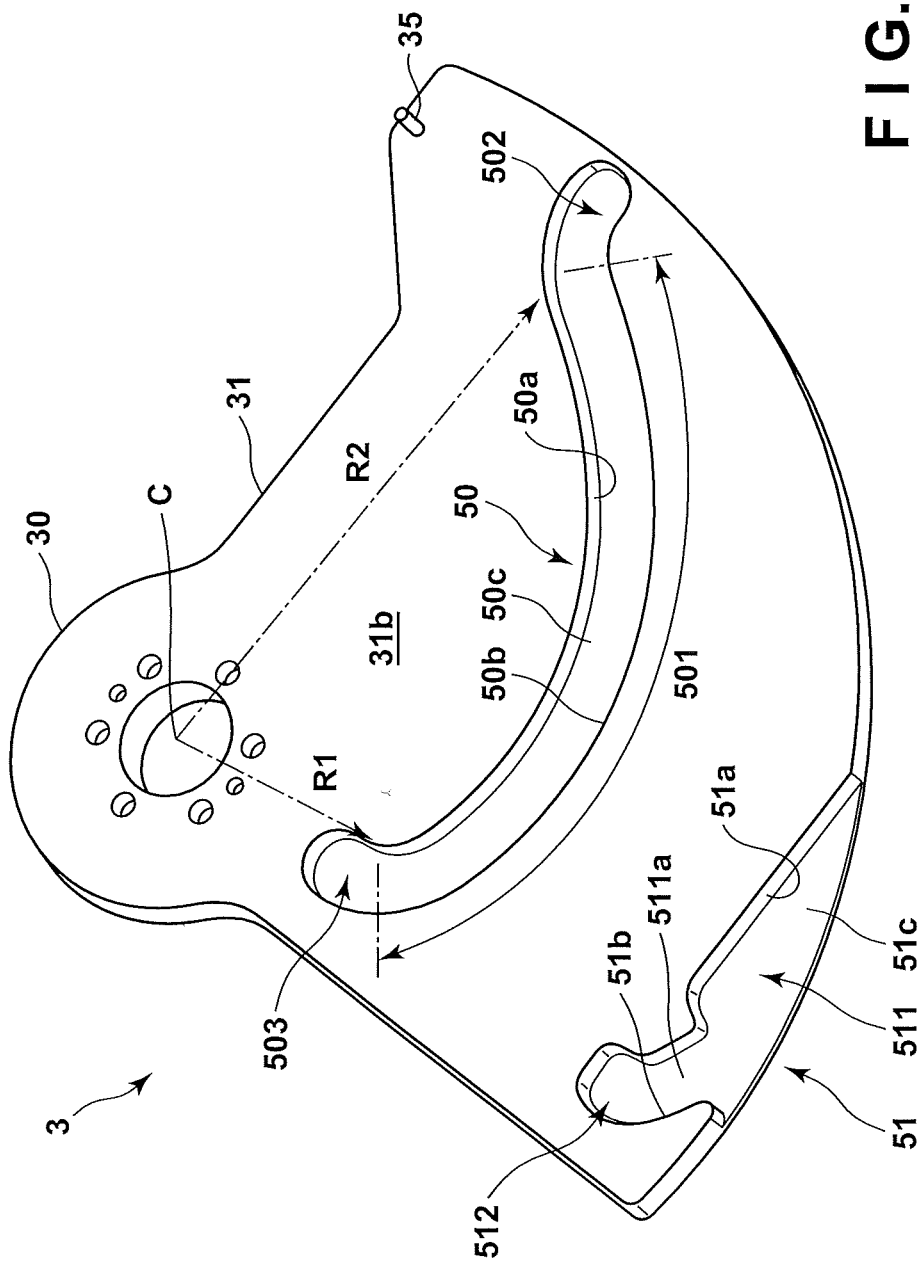
FIG. 3 is a view showing the back surface of the table.

The cam mechanism 5 and the guide mechanism 6 will be described with reference to FIGS. 2 and 3 as well. FIG. 2 is a perspective view of the turntable 1 without the table 3. FIG. 3 is a view showing the lower surface 31b of the turntable 1.

The cam mechanism 5 is a mechanism configured to convert the linear motion of the electric cylinder 4 into the rotary motion of the table 3. The cam mechanism 5 includes cam grooves 50 and 51 provided on the side of the table 3, a cam follower 52 that engages with the cam groove 50, and a cam follower 53 that engages with the cam groove 51. In this embodiment, the cam followers 52 and 53 are rollers having the same size. Note that in this embodiment, two sets of cam grooves and cam followers are provided. However, one set may be provided, or three or more sets may be provided.

The guide mechanism 6 guides the linear motions of the cam followers 52 and 53. The cam followers 52 and 53 are guided in a direction that passes through the rotation center line C and is parallel to the linear motion direction (the X direction in this embodiment) of the electric cylinder 4. The guide mechanism 6 includes a rail 60, a support member 61, a plurality of columns 63, and a guide member 64.

The rail 60 is fixed to the main body 20 of the base 2 and extended in parallel to the linear motion direction of the electric cylinder 4. The rail 60 guides the movement of the support member 61. The support member 61 is a slide member that is connected to an end of the rod 42 of the electric cylinder 4 and slides on the rail 60 in the X direction as the rod 42 expands and contracts.

Two shafts 61a extending in the Z direction stand on the support member 61. The cam followers 52 and 53 are rotatably supported in the same height at the upper end of one shaft 61a and the upper end of the other shaft 61a, respectively. The two shafts 61a are spaced part in the X direction. Hence, the cam followers 52 and 53 are also spaced apart in the X direction.

The guide member 64 is a plate-shaped member that is supported by the plurality of columns 63 standing on the main body 20 of the base 2 and extends in the horizontal direction. A guide groove 64a configured to guide the movements of the cam followers 52 and 53 is formed in the guide member 64 while extending through the guide member 64 in the thickness direction. The guide groove 64a extends in parallel to the linear motion direction (X direction) of the electric cylinder 4 and also extends in the radial direction with respect to the rotation center line C. In other words, the guide groove 64a extends along a line that is parallel to the linear motion direction (X direction) of the electric cylinder 4 and passes through the rotation center line C. The cam followers 52 and 53 reciprocally move in the X direction along the guide groove 64a.

The cam grooves 50 and 51 are formed in the lower surface 31b of the table 3. The cam groove 50 is a groove including a side wall 50a on the side of the rotation center line C, a side wall 50b on the opposite side, and a bottom wall (top wall during use) 50c and having a rectangular section. The cam groove 50 is a groove extending from the vicinity of the rotation center line C of the table 3 to the outer peripheral portion and laving two closed ends. The cam groove 50 includes three portions in the extending direction. More specifically, the cam groove 50 includes a rotation guide portion 501, a stop portion 502 on the outer peripheral side, and an escape portion 503 on the inner peripheral side.

The rotation guide portion 501 is a portion that guides the rotation of the table 3. At the inner peripheral side end (escape portion 503) of the rotation guide portion 501, the distance from the rotation center line C in the radial direction is set to R1. The distance from the rotation center line C in the radial direction continuously changes and increases toward the outer peripheral side end (stop portion 502) via the rotation guide portion 501. At the outer peripheral side end (stop portion 502), the distance from the rotation center line C is R2 (>R1). In addition, the rotation guide portion 501 extends in the circumferential direction about the rotation center line C from the inner peripheral side end to the outer peripheral side end. When the cam follower 52 engaging with the cam groove 50 moves in the X direction while being in slidable contact with the side wall 50a or side wall 50b in the rotation guide portion 501, a turning force is applied to the table 3. If the table 3 rotates in one direction, the cam follower 52 comes into slidable contact with the side wall 50a. If the table 3 rotates in the opposite direction, the cam follower 52 comes into slidable contact with the side wall 50b.

The stop portion 502 and the escape portion 503 extend in the radial direction with respect to the rotation center line C of the table 3. In other words, the stop portion 502 and the escape portion 503 extend from the two ends of the rotation guide portion 501 toward the rotation center line C of the table 3. For this reason, when the cam follower 52 moves in the stop portion 502 or the escape portion 503, the turning force is not applied to the table 3. The side wall 50a of the stop portion 502 abuts against the cam follower 52, thereby stopping the rotation of the table 3 in the one direction. The escape portion 503 can be used as a stop portion that stops the rotation of the table 3 in the other direction. In this embodiment, however, the cam groove 51 is caused to stop the rotation of the table 3 in the other direction. The escape portion 503 is formed to prevent the cam follower 52 from abutting against the side walls 50a and 50b at that time.

The cam groove 51 is a groove including a side wall 51a on the side of the rotation center line C, a side wall 51b on the opposite side, and a bottom wall (top wall during use) 51c. The cam groove 51 is formed on the outer peripheral portion of the table 3, and has one end closed and the other end open to the outer peripheral side surface of the table 3. The cam groove 51 includes a stop portion 512 on the closed end side, and an open portion 511 on the open end side.

The open portion 511 is a portion that permits the cam follower 53 to enter from the outside of the table 3 into the cam groove 51 and to exit from the cam groove 51. A rotation guide portion 511a configured to guide the rotation of the table 3 is formed between the open portion 511 and the stop portion 512. The stop portion 512 extends in the radial direction with respect to the rotation center line C of the table 3. In other words, the stop portion 512 extends from an end (an end on the opposite side of the end on the side of the open portion 511) of the rotation guide portion 511a toward the rotation center line C of the table 3. For this reason, when the cam follower 52 moves the stop portion 512, the turning force is not applied to the table 3. The side wall 51b of the stop portion 512 abuts against the cam follower 52, thereby stopping the rotation of the table 3 in the opposite direction. The stop portion 512 is arranged while being spaced apart from the stop portion 502 in the circumferential direction about the rotation center line C. The stop portion 512 and the escape portion 503 are arranged in line along a line passing through the rotation center line C. The stop portion 512 is located on the outer peripheral side with respect to the escape portion 503. The stop portion 512 and the escape portion 503 are spaced apart from each other by the separation distance between the two cam followers 52 and 53.

Figure 4:
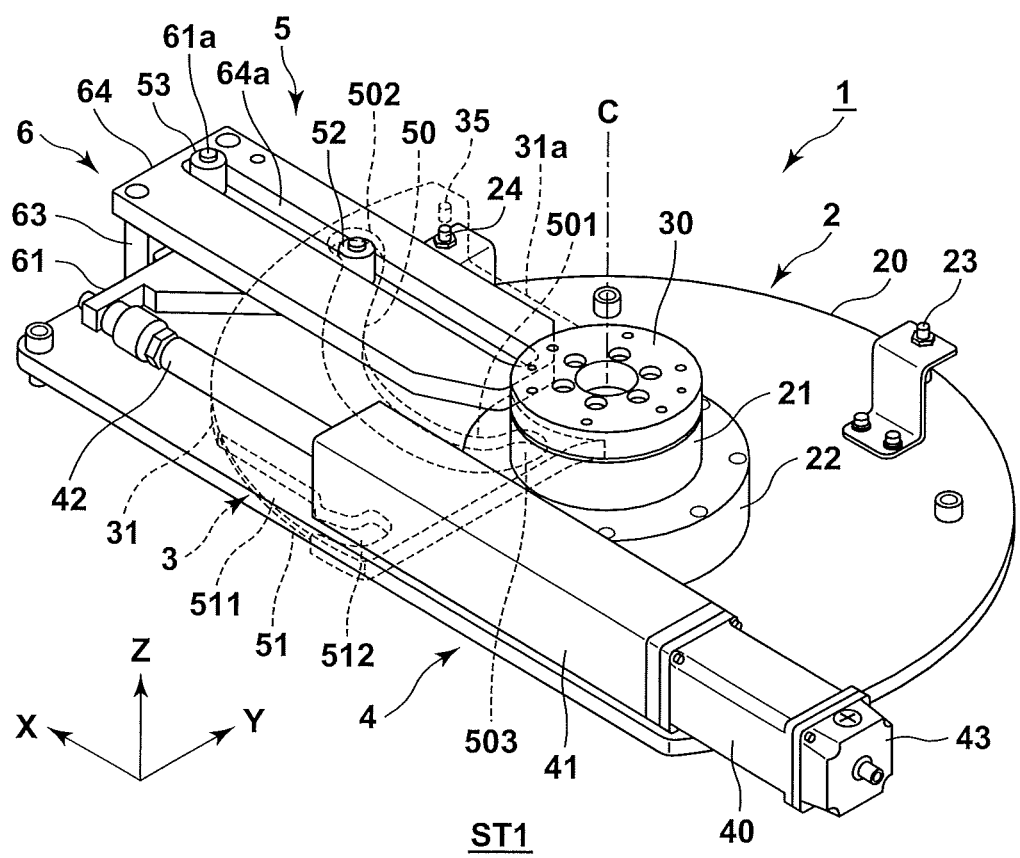
FIG. 4 is an explanatory view of the operation of the turntable shown in FIG. 1.
Figure 5:
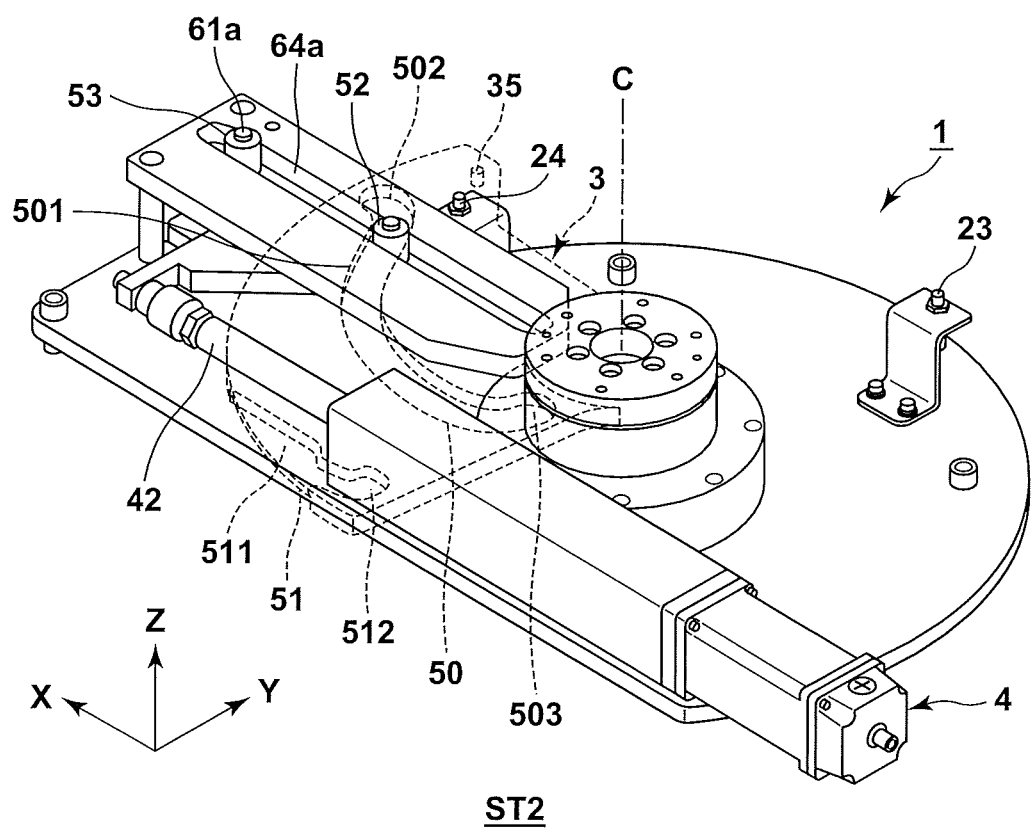
FIG. 5 is an explanatory view of the operation of the turntable shown in FIG. 1.

The operation of the turntable 1 will be described with reference to FIGS. 4 to 9. A state ST1 shown in FIG. 4 shows a state which the table 3 is located at an end of its rotation range. Sensors 23 and 24 configured to detect the position of the table 3 are arranged on the base 2. The sensors 23 and 24 are sensors that detect a detection target piece 35 provided on the lower surface 31b of the table 3 and are each formed from a magnetic senor (proximity sensor). The sensor 24 detects that the table 3 is located at an end of its rotation range. As indicated by the state ST1, the detection target piece 35 and the sensor 24 are located at positions facing each other on a horizontal plane (XY plane). The sensor 23 detects that the table 3 is located at the other end of its rotation range. Switching between the driving, stop, and expanding/contracting operations of the electric cylinder 4 can be done based on the detection results of the sensors 23 and 24.

In the state ST1 shown in FIG. 4, the cam follower 52 is located in the stop portion 502 of the cam groove 50. The cam follower 53 is located outside the cam groove 51. The electric cylinder 4 is in an extended state. If the electric cylinder 4 is driven from this state to contract the rod 42, the cam followers 52 and 53 start moving to the side of the rotation center line C in the X direction, as indicated by a state ST2 shown in FIG. 5. The cam follower 52 is guided to the rotation guide portion 501, and the table 3 starts rotating in one direction (clockwise in FIG. 5) in accordance with the engagement between the cam follower 52 and the rotation guide portion 501. The detection target piece 35 thus separates from the sensor 24, detection of the detection target piece 35 by the sensor 24 is turned off, and it is confirmed that the table 3 has started rotating.

Figure 6:
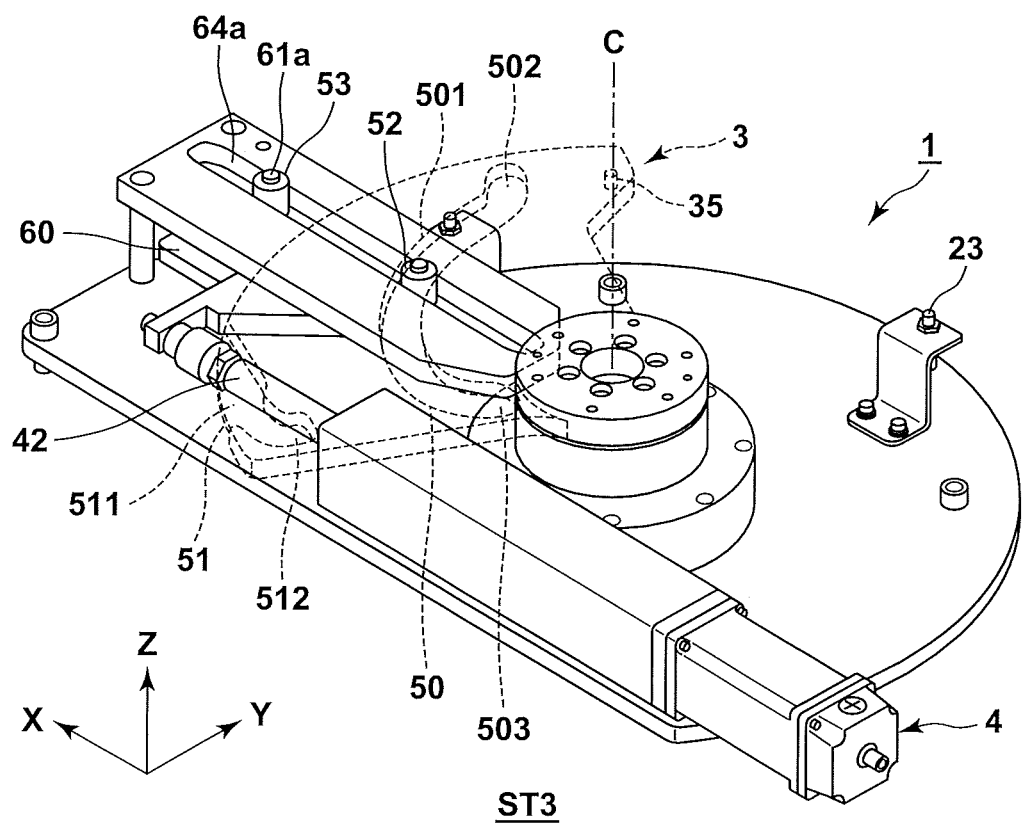
FIG. 6 is an explanatory view of the operation of the turntable shown in FIG. 1.
Figure 7:
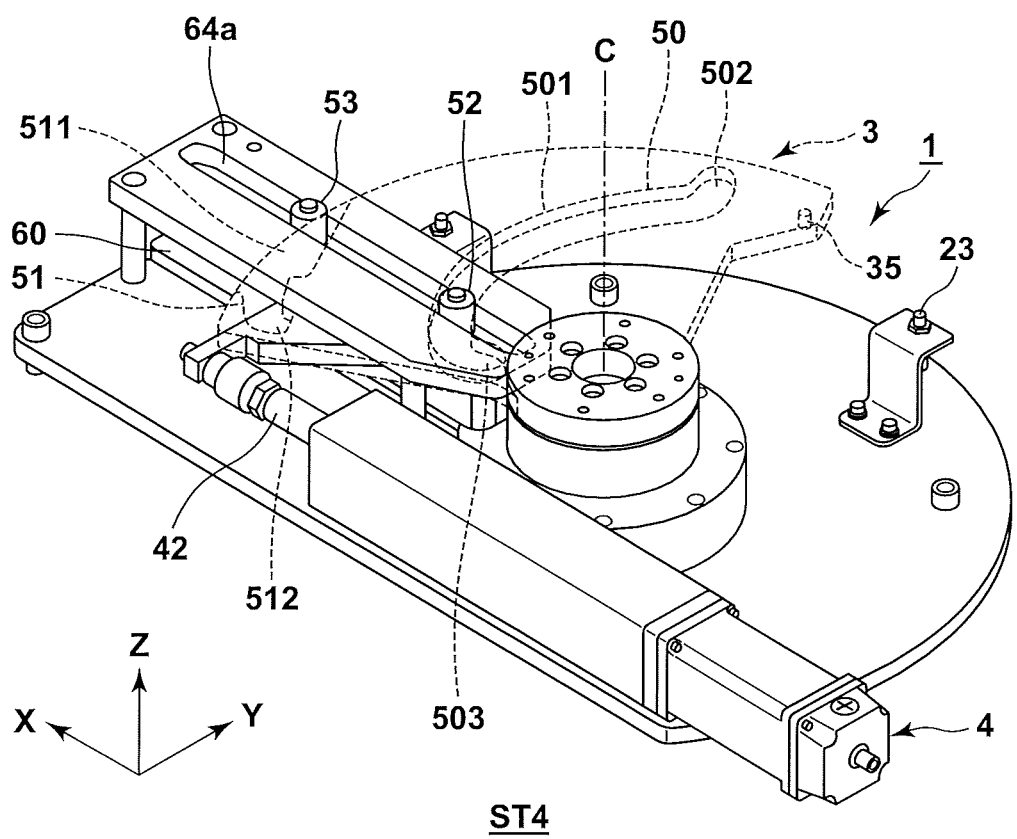
FIG. 7 is an explanatory view of the operation of the turntable shown in FIG. 1.
Figure 8:
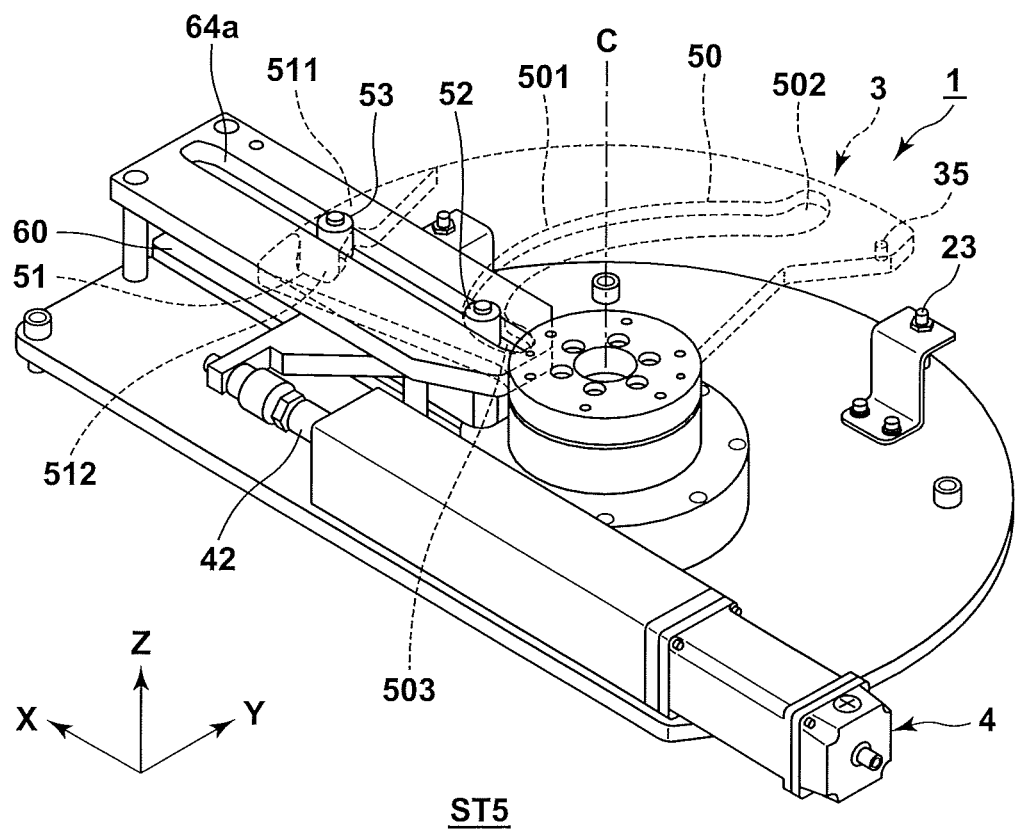
FIG. 8 is an explanatory view of the operation of the turntable shown in FIG. 1.
Figure 9:
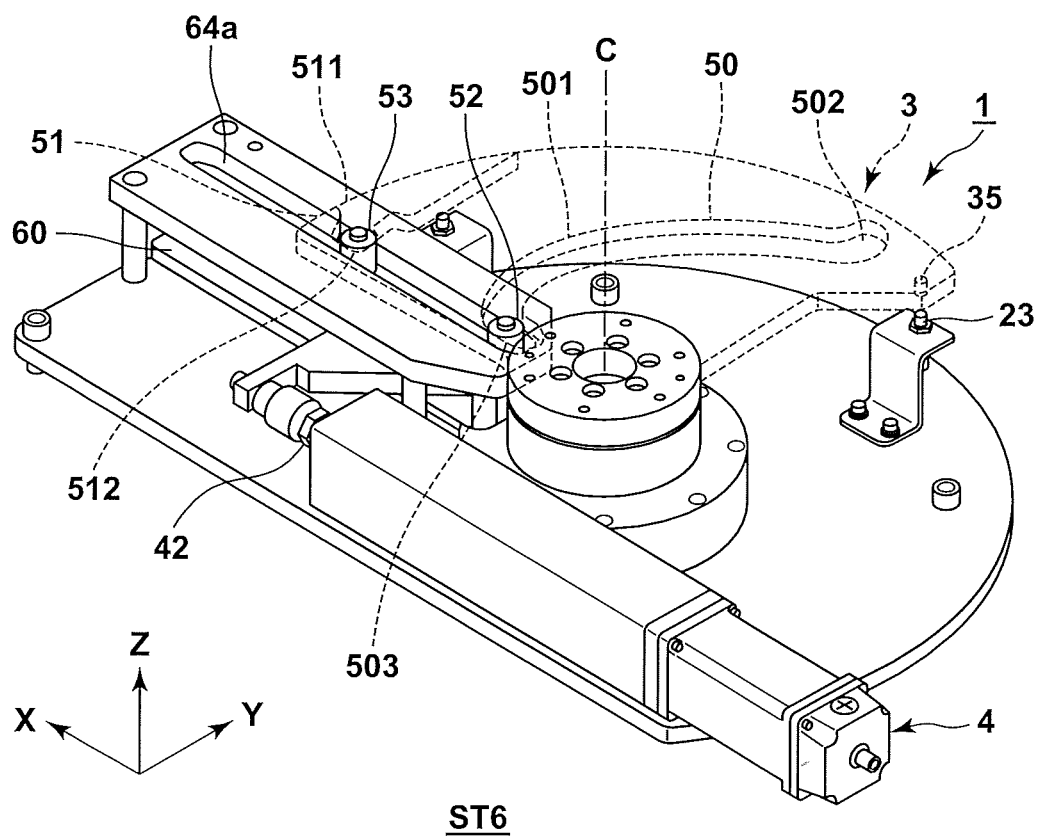
FIG. 9 is an explanatory view of the operation of the turntable shown in FIG. 1.

When the rod 42 is further contracted, the cam follower 52 changes its position from the outer peripheral side to the inner peripheral side along the rotation guide portion 501, and the rotation of the table 3 thus progresses, as indicated by a state ST3 shown in FIG. 6. Additionally, as indicated by a state ST4 shown FIG. 7, the cam follower 53 starts entering the cam groove 51. At the stage of a state ST5 shown in FIG. 8, the cam follower 53 completely enters the open portion 511, and the cam follower 52 approaches the inner peripheral side end of the rotation guide portion 501.

When the rod 42 is further contracted, the cam follower 52 enters from the rotation guide portion 501 into the escape portion 503, and the cam follower 53 enters from the open portion 511 into the stop portion 512. The cam grooves 50 and 51 are formed such that the cam follower 53 engages with the closed end of the stop portion 512 before the cam follower 52 engages with (abuts against) the closed end of the escape portion 503. In other words, the extending length in the escape portion 503 toward the rotation center line C is made slightly larger than the extending length in the stop portion 512 toward the rotation center line C. Accordingly, before the cam follower 52 abuts against the closed end of the escape portion 503, the cam follower 53 abuts against the closed end of the stop portion 512 to stop the rotation of the table 3. A state ST6 shown in FIG. 9 indicates a state in which the table 3 is located at the other end of its rotation range. The electric cylinder 4 is in a contracted state. The cam follower 53 is located at the closed end of the stop portion 512, and the cam follower 52 is located at the closed end of the escape portion 503. The detection target piece 35 and the sensor 23 face each other on the horizontal plane (XY plane), and detection of the detection target piece 35 by the sensor 23 is turned on, thereby detecting that the table 3 is located at the other end of its rotation range. The rotation operation of the table 3 in one direction is thus completed.

To rotate the table 3 in the reverse direction (counterclockwise), a reverse procedure (state ST6→state ST1) is performed. This will briefly be described. When the electric cylinder 4 is extended from the state ST6 shown in FIG. 9, the cam followers 52 and 53 start moving in the X direction in a direction to separate from the rotation center line C. The cam follower 53 is guided to the rotation guide portion 511a. When the cam follower 53 engages with the rotation guide portion 511a, the table 3 starts rotating in the reverse direction. The detection target piece 35 thus separates from the sensor 23, detection of the detection target piece 35 by the sensor 23 is turned off, and it is confirmed that the table 3 has started rotating in the reverse direction.

Along with the reverse rotation of the table 3, the cam follower 52 is guided to the rotation guide portion 501. The reverse rotation of the table 3 progresses from then on in accordance with the engagement between the cam follower 52 and the rotation guide portion 501. Additionally, the cam follower 53 exits (pops out) from the cam groove 51 at a certain point of time. When changing from the state ST2 shown in FIG. 5 to the state ST1 shown in FIG. 4, the cam follower 52 abuts against the closed end of the stop portion 502 to stop the reverse rotation of the table 3. At this time, since the cam follower 53 has exited from the cam follower 53, the engagement between the cam follower 53 and the cam groove 51 has been canceled.

As described above, the turntable 1 according to this embodiment uses the cam mechanism 5 as the mechanism that converts the linear motion of the electric cylinder 4 into the rotary motion of the table 3. In particular, a cam mechanism in which the cam followers 52 and 53 slide against the cam grooves 50 and 51 is used. It is therefore possible to smoothly rotate the table 3 at high responsiveness. Additionally, since the structure is relatively simple, the number of parts is small, and excellent maintenance properties can be obtained.

If a heavy object is placed on the table 3, a large inertial force in a direction to continue the rotation of the table 3 acts when stopping the rotation of the table 3. In this embodiment, the outer peripheral side end of the cam groove 50 is formed as the stop portion 502, and the inner peripheral side end is not a stop portion but the escape portion 503. The stop portion 512 is formed in the cam groove 51. If the escape portion 503 is a stop portion, a large inertial force acts on the escape portion 503 serving as a fulcrum based on the principle of leverage because the escape portion 503 is located at a position close to the rotation center line C. This increases the impact of abutment between the cam groove 50 and the cam follower 52. To prevent the table 3 or cam follower 52 from breaking, these parts need to have high rigidity. On the other hand, in this embodiment, both the stop portions 502 and 512 are located on the outer peripheral side of the table 3. In other words, since the stop portions 502 and 512 are located at positions apart from the rotation center line C, the inertial force acting on the stop portions 502 and 512 each serving as a fulcrum of the principle of leverage is small. This decreases the impact of abutment between the cam grooves 50 and 51 and the cam followers 52 and 53. It is therefore possible to avoid breakage of the constituent components while making the rigidity of the constituent components relatively low.

Second Embodiment

In the turntable 1 according to the first embodiment, an example has been described in which the table 3 is made to pivot by 90° using one electric cylinder 4. However, the pivotal range of the turntable is not limited to 0° to 90° and may be 0° to 180°.

Figure 10:
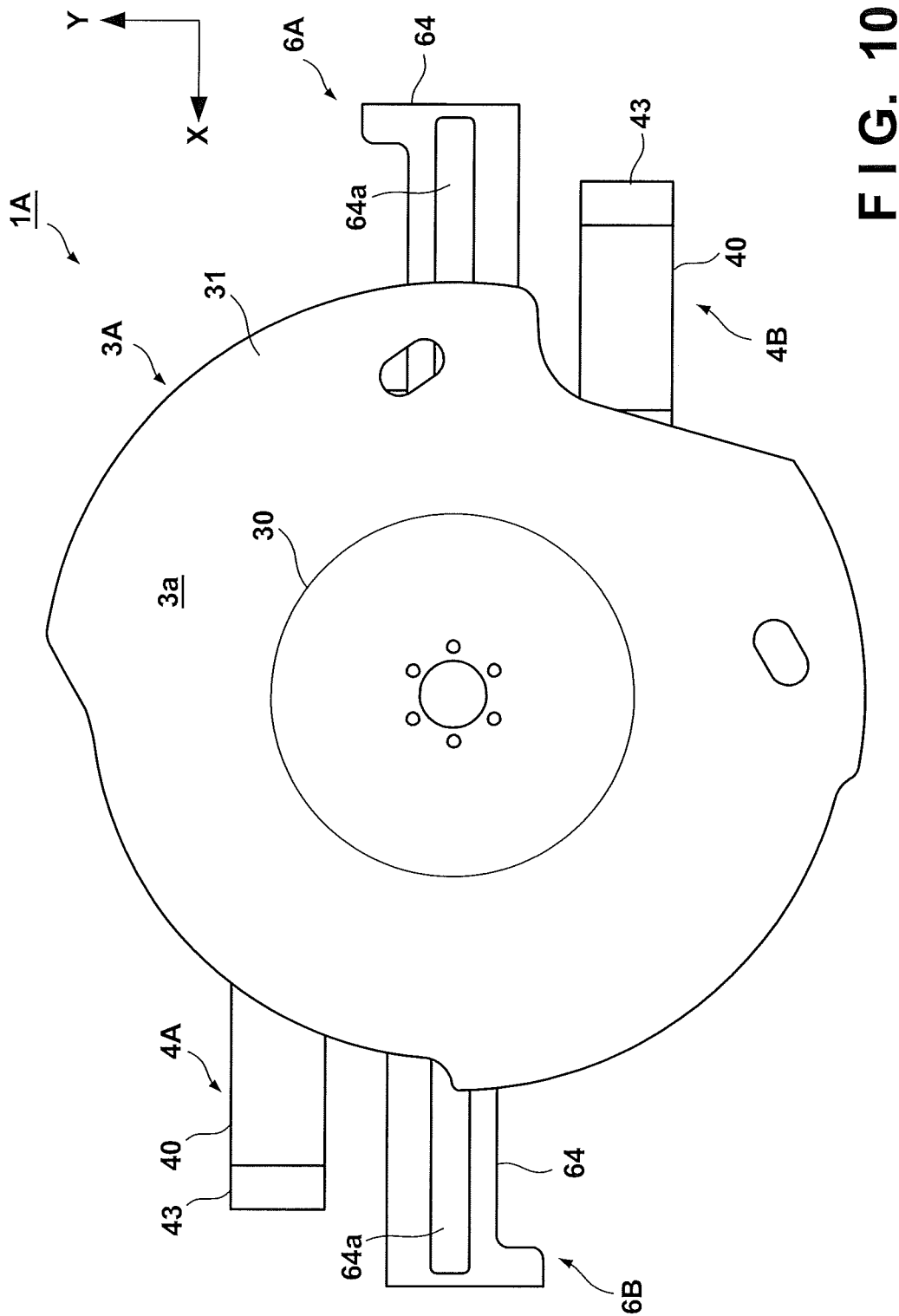
FIG. 10 is a plan view of a turntable according to another embodiment.
Figure 11:
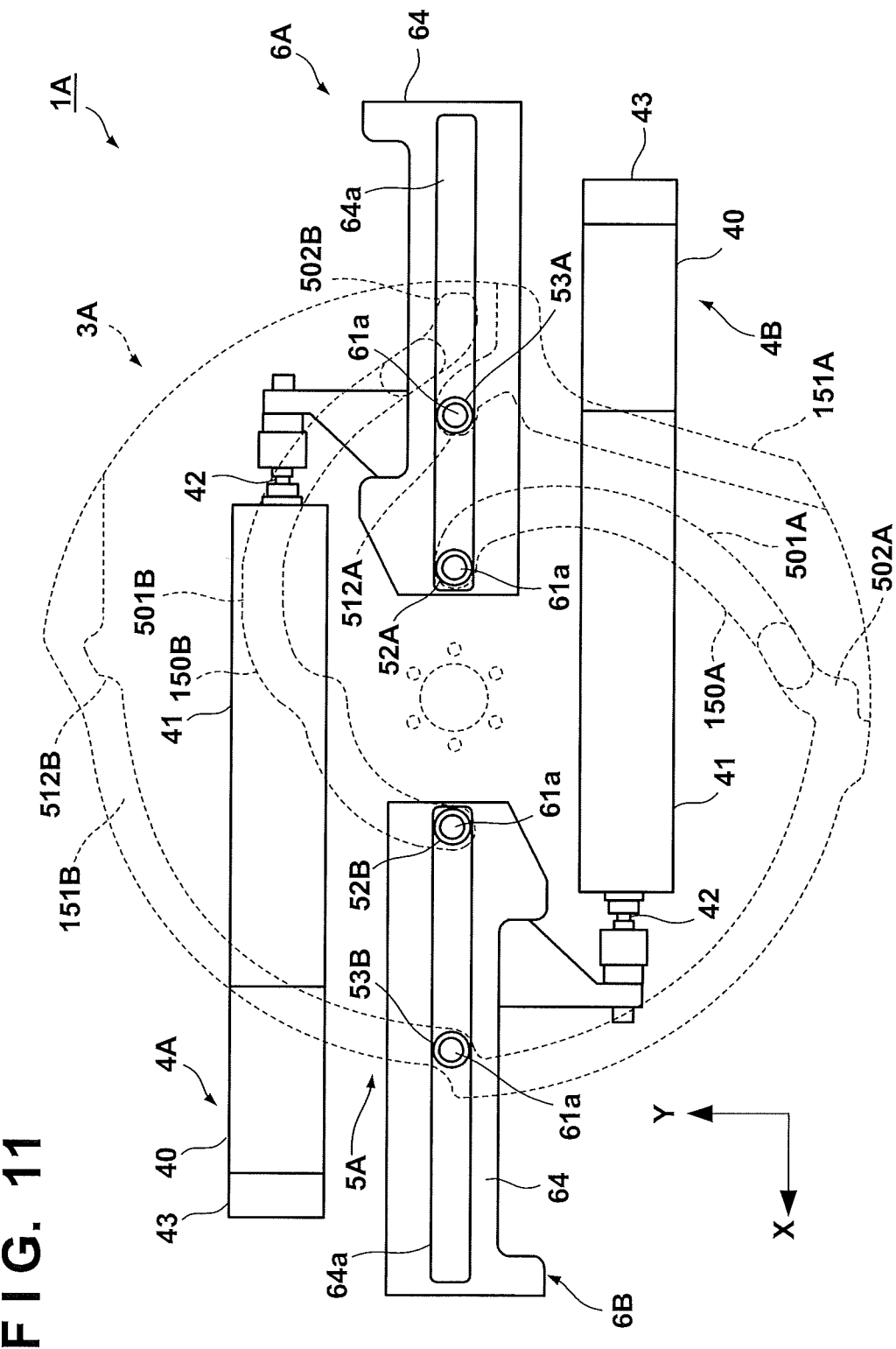
FIG. 11 is a perspective view of the turntable shown in FIG. 10.
Figure 12:
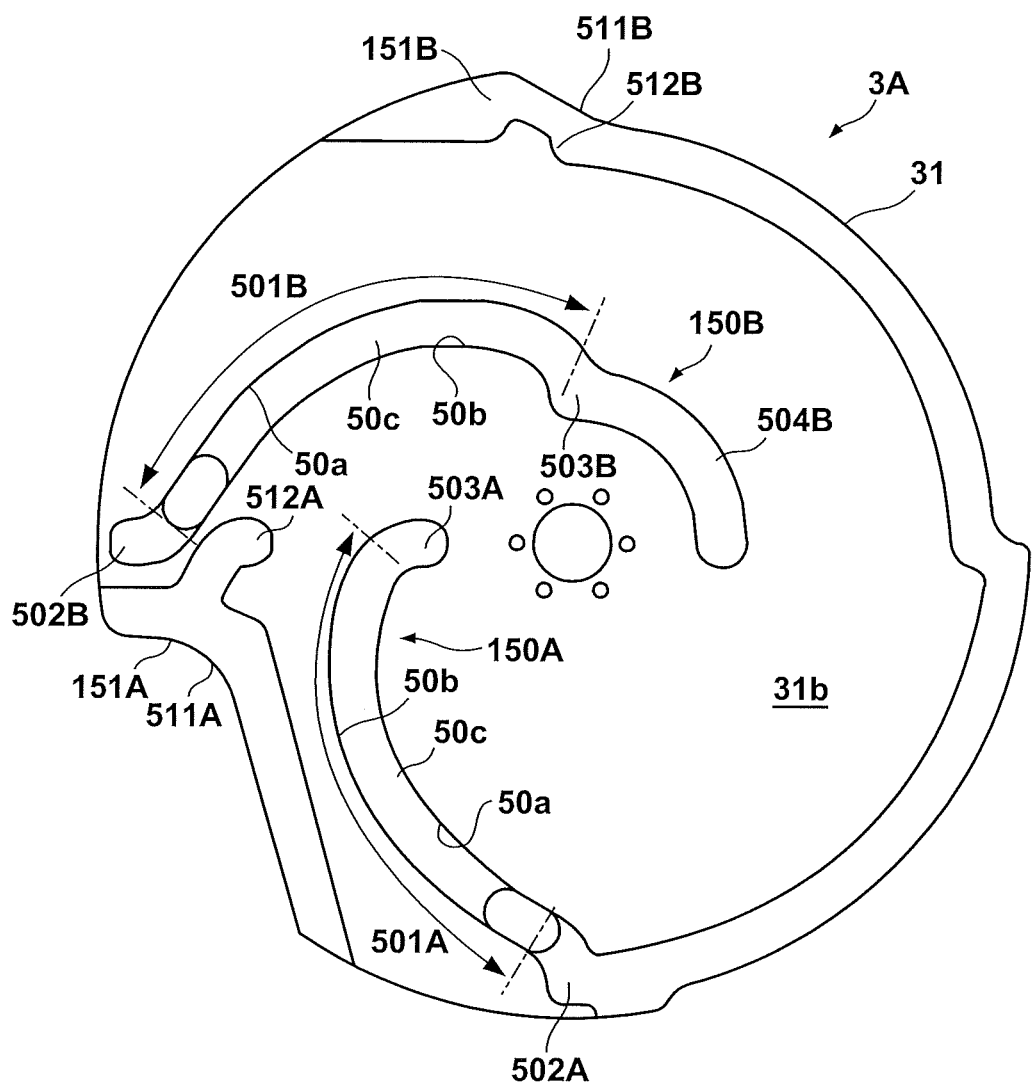
FIG. 12 is a view showing the back surface of a table.
Figure 13:
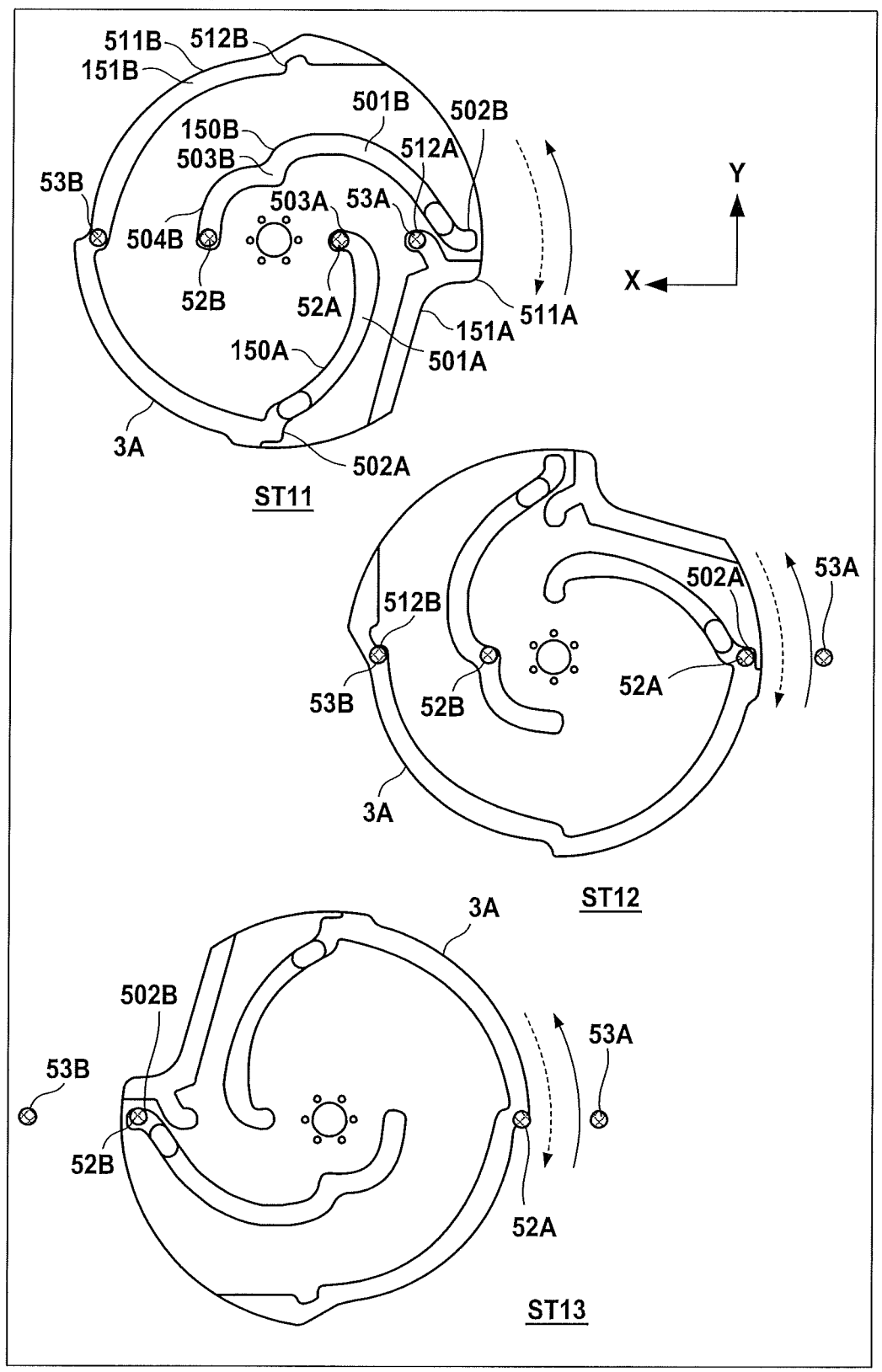
FIG. 13 is an explanatory view of the operation of the turntable shown in FIG. 10.

As an arrangement that makes the table 3 pivot within the range of 0° to 180°, an arrangement including a plurality of electric cylinders 4 in one table 3 can also be employed. FIGS. 10 to 13 show an example. FIG. 10 is a plan view of a turntable 1A according to the embodiment. FIG. 11 is a perspective view of the turntable 1A seen through a table 3A. FIG. 12 is a view showing the back surface of the table 3A. FIG. 13 is an explanatory view of the operation of the turntable 1A. FIG. 13 is a perspective plan view showing the pivoting form of the table 3A. The same reference numerals as in the first embodiment denote the same parts in FIGS. 10 to 13, and a description thereof will be omitted. The basic arrangement of the turntable 1A is the same as in the first embodiment except that a plurality of electric cylinders 4 are provided in one table 3. This point will mainly be explained.

As shown in FIG. 10, the turntable 1A according to this embodiment includes two sets of components (electric cylinders 4A and 4B and guide mechanisms 6A and 6B) corresponding to each of the electric cylinder 4 and the guide mechanism 6 in the first embodiment. As shown in FIG. 11, a cam mechanism 5A corresponding to the cam mechanism 5 according to the first embodiment includes cam followers 52A, 52B, 53A, and 53B and cam grooves 150A, 150B, 151A, and 151B. The linear motions of the cam followers 52A and 53A are guided by the guide mechanism 6A, and the linear motions of the cam followers 52B and 53B are guided by the guide mechanism 6B.

The set of the cam followers 52A and 53A and the set of the cam followers 52B and 53B are independently moved by driving the corresponding electric cylinders 4A and 4B. In this embodiment, the set of the cam followers 52A and 53A and the set of the cam followers 52B and 53B move on the same line passing through the rotation center line of the table 3A. However, they may move on different lines.

As shown in FIG. 12, the cam grooves 150A, 150B, 151A, and 151B are formed in a lower surface 31b of the table 3A. The cam groove 150A is a groove having an open end on the outer peripheral side and a closed end on the inner peripheral side, and engages with the cam follower 52A. The cam groove 150A includes a rotation guide portion 501A, a stop portion 502A on the outer peripheral side, and an escape portion 503A on the inner peripheral side. Defining the initial position as 0°, the rotation guide portion 501A guides the pivotal movement of the table 3A within the range of 0° to 90°. The cam groove 151A is formed on the outer peripheral side of the table 3A, and includes an open portion 511A on the open end side, and a stop portion 512A on the closed end side. The cam follower 53A engages with the cam groove 151A.

The cam groove 150B is a groove with two ends closed, and engages with the cam follower 52B. The cam groove 150B includes a rotation guide portion 501B, a stop portion 502B on the outer peripheral side, an escape portion 503B on the inner peripheral side, and an interference preventing portion 504B. Defining the initial position as 0°, the rotation guide portion 501B guides the pivotal movement of the table 3A within the range of 90° to 180°. The interference preventing portion 504B is formed to be a concentric arc with respect to the rotation center of the table 3A. When the table 3A pivots within the range of 0° to 90°, the interference preventing portion 504B avoids the interference between the cam follower 52B and the table 3A.

The cam groove 151B is formed on the outer peripheral side of the table 3A, and includes an open portion 511B on the open end side and a stop portion 512B on the closed end side. In this embodiment, the cam groove 151B is formed in a broad range. When the table 3A pivots within the range of 90° to 180°, the cam groove 151B avoids the interference between the cam follower 52A and the table 3A. When the table 3A pivots within the range of 0° to 90°, the cam groove 151B avoids the interference between the cam follower 53B and the table 3A.

The operation form of the cam mechanism 5A and the pivoting form of the table 3A will be described with reference to FIG. 13. A state ST11 indicates a case in which the table 3A is located at the initial position. The cam followers 52A, 52B, 53A, and 53B are also located at the initial positions (positions closest to the rotation center). The cam follower 52A is located in the escape portion 503A, the cam follower 52B is located in the interference preventing portion 504B, and the cam follower 53A is located in the stop portion 512A.

When the cam followers 52A and 53A are moved from the state ST11 in a direction to move away from the rotation center of the table 3A by driving the electric cylinder 4A, the table 3A starts rotating counterclockwise as indicated by a solid arrow in accordance with the engagement between the cam follower 52A and the rotation guide portion 501A. At this time, the cam follower 52B is in the interference preventing portion 504B, and never guides the rotation of the table 3A or impedes the guide of the rotation.

When the table 3A is rotated by 90°, the cam follower 52A is located in the stop portion 502A, and the application of the turning force to the table 3A stops, as indicated by a state ST12. However, the abutment between the cam follower 52A and the stop portion 502A does not occur. The cam follower 53B is located in the stop portion 512B, thereby stopping the rotation of the table 3A. When the abutment between the cam follower 53B and the stop portion 512B occurs on the outer peripheral side of the table 3A, the impact of the abutment can be made small.

When the cam followers 52B and 53B are moved from the state ST11 in a direction to move away from the rotation center of the table 3A by driving the electric cylinder 4B, the table 3A further rotates counterclockwise in accordance with the engagement between the cam follower 52B and the rotation guide portion 501B. At this time, the cam follower 52A is in the cam groove 151B, and never guides the rotation of the table 3A or impedes the guide of the rotation.

When the table 3A is further rotated by 90° (180° in total), the cam follower 52B is located in the stop portion 502B to stop the rotation of the table 3A. When the abutment between the cam follower 52B and the stop portion 502B occurs on the outer peripheral side of the table 3A, the impact of the abutment can be made small. The table 3A is thus rotated counterclockwise by 180°.

A case in which the table 3A is rotated by 180° clockwise indicated by a broken arrow and returned from a state ST13 to the state ST11 will be described next. Basically, a reverse procedure is performed.

When the cam followers 52B and 53B are moved from the state ST13 in a direction to move close to the rotation center of the table 3A by driving the electric cylinder 4B, the table 3A starts rotating clockwise in accordance with the engagement between the cam follower 52B and the rotation guide portion 501B. When the table 3A rotates by 90°, the state returns to the state ST12. At this time, the cam follower 52A is located in the stop portion 502A to stop the rotation of the table 3A. When the abutment between the cam follower 52A and the stop portion 512B occurs on the outer peripheral side of the table 3A, the impact of the abutment can be made small.

When the cam followers 52A and 53A are moved from the state ST12 in a direction to move close to the rotation center of the table 3A by driving the electric cylinder 4A, the table 3A further rotates clockwise in accordance with the engagement between the cam follower 52A and the rotation guide portion 501A. When the table 3A is further rotated by 90° (180° in total), the cam follower 52A is located in the escape portion 503A, and the application of the turning force to the table 3A stops. At this time, the cam follower 53A is located in the stop portion 512A to stop the rotation of the table 3A. When the abutment between the cam follower 53A and the stop portion 512A occurs on the outer peripheral side of the table 3A, the impact of the abutment can be made small. The table 3A is thus rotated clockwise by 180° and returned to the initial position.

Next, as an arrangement that makes the table 3 pivot within the range of 0° to 180°, for example, an arrangement including two, upper and lower stages can be formed by mounting another turntable 1 on the table 3 of the turntable 1 according to the first embodiment, as an embodiment different from that shown in FIGS. 10 to 13. Accordingly, when the table 3 of the lower stage pivots, the table 3 of the upper stage pivots within the range of 0° to 90°. In addition, when the table 3 of the upper stage pivots within the range of 0° to 90°, a work placed on the table 3 of the upper stage can be made to pivot within the range of 0° to 180°.

At for the rotation timing of each table 3, after one of the turntables 1 may be rotated by 0° to 90°, the other turntable 1 may be rotated by 0° to 90°, thereby rotating the entire structure by 0° to 180° (alternating driving type). Alternatively, both tables 3 may synchronously be driven to synchronously rotate the turntables 1 within the range of 0° to 45°, thereby rotating the entire structure within the range of 0° to 90°. Next, the turntables 1 may synchronously be rotated within the range of 45° to 90°, thereby rotating the entire structure within the range of 90° to 180° (synchronous driving type). The synchronous driving type can rotate the tables 3 in a shorter time than the alternating driving type.

The present invention is not limited to the above embodiments, and various changes and modifications can be made within the spirit and scope of the present invention. Therefore, to apprise the public of the scope of the present invention, the following claims are made.

The invention claimed is:

1. A turntable comprising:
a table rotatably supported;
an electric cylinder; and
a cam mechanism configured to convert a linear motion of the electric cylinder into a rotary motion of the table,
wherein the cam mechanism comprises:
at least one cam groove provided on a side of the table; and
at least one cam follower moved in parallel to a linear motion direction of the electric cylinder and configured to engage with the at least one cam groove,
a first cam groove and a second cam groove are provided as the at least one cam groove,
a first cam follower and a second cam follower are provided as the at least one cam follower,
the first cam groove includes:
a rotation guide portion configured to engage with the first cam follower and guide a rotation of the table; and
a first stop portion configured to engage with the first cam follower and stop the rotation of the table,
the second cam groove includes a second stop portion configured to engage with the second cam follower and stop the rotation of the table, and
the first cam follower and the second cam follower are spaced apart in the linear motion direction.

2. The turntable according to claim 1, wherein the first stop portion and the second stop portion extend in a radial direction with respect to the rotation center of the table.

3. The turntable according to claim 1, wherein the first stop portion and the second stop portion are spaced apart in a circumferential direction of the table,
the second cam groove is formed such that an engagement between the second cam follower and the second cam groove is canceled when the first cam follower engages with the first stop portion, and
the first cam groove is formed such that an engagement between the first cam follower and the first cam groove is canceled when the second cam follower engages with the second stop portion.

4. The turntable according to claim 3, wherein the first cam groove extends from a vicinity of a rotation center of the table to a vicinity of an outer peripheral portion of the table, has two ends closed, and includes the first stop portion formed at one end on the outer peripheral portion, and
the second cam groove is formed on the outer peripheral portion of the table, has one end closed and the other end open, and includes the second stop portion formed at the one end.

5. The turntable according to claim 1, wherein
the cam mechanism comprises:
a support member connected to the electric cylinder and configured to support the first cam follower and the second cam follower; and
a guide member including a guide groove extending in parallel to the linear motion direction, and
the first cam follower and the second cam follower are moved along the guide groove.

6. A turntable, comprising:
a table mounted for rotational movement;
an electric cylinder;
a first cam follower and a second cam follower that are connected to the electric cylinder and moves in a linear direction in response to operation of the electric cylinder; and
a first cam groove and a second cam groove disposed on a surface of the table and engaged with the first cam follower and the second cam follower to convert the linear motion of the cam follower into rotational movement of the table,
the first cam groove includes:
a rotation guide portion configured to engage with the first cam follower and guide a rotation of the table; and
a first stop portion configured to engage with the first cam follower and stop the rotation of the table,
the second cam groove includes a second stop portion configured to engage with the second cam follower and stop the rotation of the table, and
the first cam follower and the second cam follower are spaced apart in the linear motion direction.

7. The turntable according to claim 6, wherein the first stop portion and the second stop portion are spaced apart in a circumferential direction of the table,
the second cam groove is formed such that an engagement between the second cam follower and the second cam groove is canceled when the first cam follower engages with the first stop portion, and the first cam groove is formed such that an engagement between the first cam follower and the first cam groove is canceled when the second cam follower engages with the second stop portion.

8. The turntable according to claim 6, wherein the first cam groove extends from a vicinity of a rotation center of the table to a vicinity of an outer peripheral portion of the table, has two ends closed, and includes the first stop portion formed at one end on the outer peripheral portion, and the second cam groove is formed on the outer peripheral portion of the table, has one end closed and the other end open, and includes the second stop portion formed at the one end.

9. The turntable according to claim 6, wherein the cam mechanism comprises:

a support member connected to the electric cylinder and configured to support the first cam follower and the second cam follower; and a guide member including a guide groove extending in parallel to the linear motion direction, and the first cam follower and the second cam follower are moved along the guide groove.

10. The turntable according to claim 6, wherein the first stop portion and the second stop portion extend in a radial direction with respect to the rotation center of the table.

11. A turntable, comprising:

a rotably mounted table having an upper surface for supporting a workpiece, and a lower surface opposite the upper surface;

a first cam groove and a second cam groove formed in the lower surface of the table;

an electric cylinder; and a first cam follower and a second cam follower that are moved in a linear direction in response to operation of the electric cylinder, and engages the first cam groove and the second cam groove to rotationally move the table, the first cam groove includes:

a rotation guide portion configured to engage with the first cam follower and guide a rotation of the table; and a first stop portion configured to engage with the first cam follower and stop the rotation of the table, the second cam groove includes a second stop portion configured to engage with the second cam follower and stop the rotation of the table, and the first cam follower and the second cam follower are spaced apart in the linear motion direction.

12. The turntable according to claim 11, wherein the first cam groove extends from a vicinity of a rotation center of the table to a vicinity of an outer peripheral portion of the table, has two ends closed, and includes the first stop portion formed at one end on the outer peripheral portion, and the second cam groove is formed on the outer peripheral portion of the table, has one end closed and the other end open, and includes the second stop portion formed at the one end.

13. The turntable according to claim 11, wherein the first stop portion and the second stop portion are spaced apart in a circumferential direction of the table, the second cam groove is formed such that an engagement between the second cam follower and the second cam groove is canceled when the first cam follower engages with the first stop portion, and the first cam groove is formed such that an engagement between the first cam follower and the first cam groove is canceled when the second cam follower engages with the second stop portion.

14. The turntable according to claim 11, wherein the cam mechanism comprises:

a support member connected to the electric cylinder and configured to support the first cam follower and the second cam follower; and a guide member including a guide groove extending in parallel to the linear motion direction, and the first cam follower and the second cam follower are moved along the guide groove.

15. The turntable according to claim 11, wherein the first stop portion and the second stop portion extend in a radial direction with respect to the rotation center of the table.

* * * * *